Aug. 27, 1968　　　A. V. GRESS, JR　　　3,398,598
MOTION TRANSLATION DEVICE
Filed Oct. 28, 1966

INVENTOR.
ALBERT V. GRESS, JR
BY Ernest J. Ny
ATTORNEY

United States Patent Office 3,398,598
Patented Aug. 27, 1968

3,398,598
MOTION TRANSLATION DEVICE
Albert V. Gress, Jr., Dayton, Ohio, assignor to The Bendix Corporation, a corporation of Delaware
Filed Oct. 28, 1966, Ser. No. 590,296
4 Claims. (Cl. 74—424.8)

ABSTRACT OF THE DISCLOSURE

A motion translating device of the type used to provide a driving link between a driving member and a driven member. The motion translating device is rigid in the linear direction of movement and relatively flexible in all other directions thereby providing a positive driving connection only in the linear direction of movement.

---

This invention relates to a motion translating device and more particularly to a motion transmitter connecting a linearly driven member with a driving member which is subject to non-linear movement.

Lead screws and nuts are used today on numerous types of equipment as a driving means for moving a mass or carriage in a straight line. A problem existing with this type drive means is the inability to precisely manufacture screws and coacting nuts so as to eliminate the wobble of the nut as the screw is rotated. This problem will also arise from the uneven wear of the threads. The nut wobble would thus transmit non-linear forces to the carriage resulting in a non-true linear or straight movement of the carriage. In high precision applications, even the slightest non-linearity may be critical.

A further problem of this type drive occurs when the nut and screw centerlines become non-coincident causing the nut to bind. This will occur when the nut is fixed to a linearily movable carriage and the screw axis is slightly misaligned or non-parallel with respect to the direction of movement of the carriage. Any slight oscillation of the screw about its axis or bowing of the screw will also cause a binding of the nut to the screw.

Accordingly, an object of this invention is to provide an improved motion transmitter for use with a lead screw nut which prevents binding of the nut to the screw during operation.

A further object of this invention is to provide a driving connection between a lead screw nut and a carriage which is rigid in the linear direction of movement and relatively flexible in all other directions.

Another object of this invention is to provide a motion transmitter for use with a lead screw and nut drive means which will compensate for offset or misalignment of the axis of the lead screw relative to a driven carriage so that only forces in the linear direction of movement are transmitted to the carriage.

Figure 1:
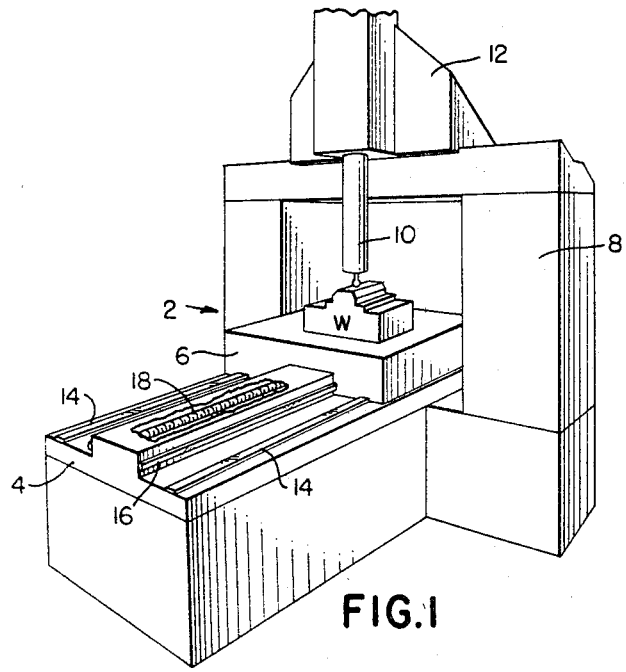
Figure 3:
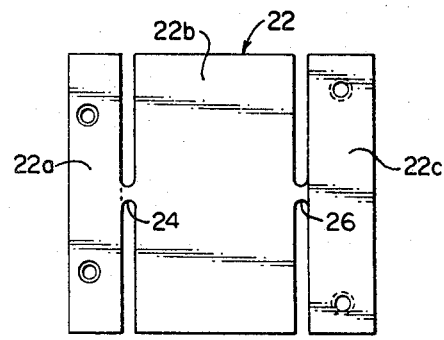
Figure 4:
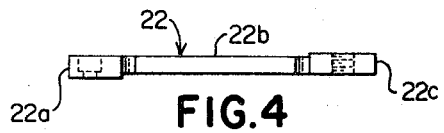
Figure 2:
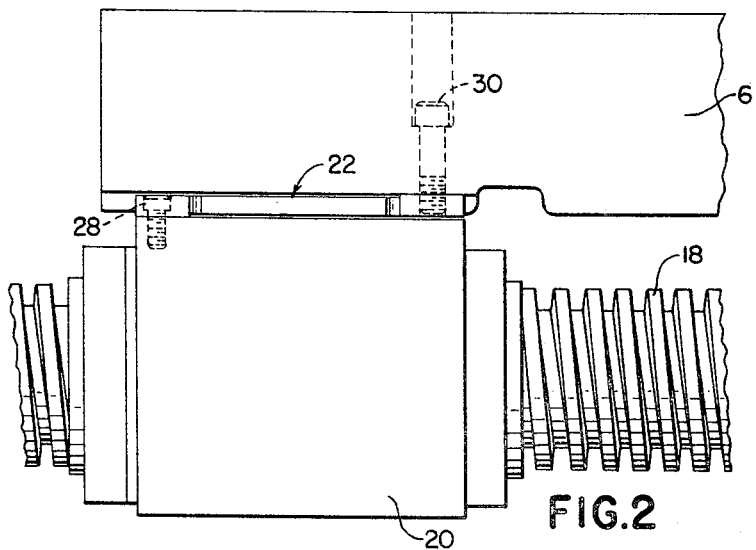
Figure 5:
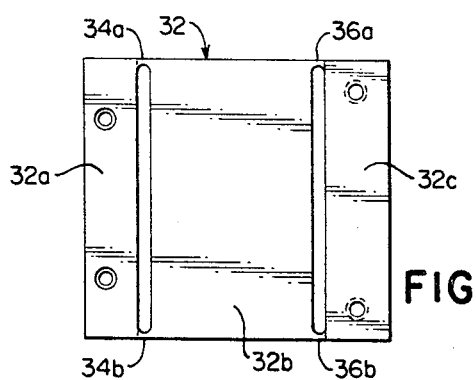

Other objects and advantages of the invention will be apparent from the following description, the appended claims, and the accompanying drawings, in which, FIG. 1 is a perspective view of an exemplary precision measuring machine embodying the invention, FIG. 2 is a partial side view showing the drive means and the motion transmitter connected to the carriage, FIG. 3 is a top view of the motion transmitter, FIG. 4 is a side view of the transmitter shown in FIG. 3, and FIG. 5 is a top view of a second configuration of the motion transmitter.

A motion transmitter is shown for use where a movable member is driven by a lead screw and nut arrangement. The connection between nut and carriage is rigid in the linear direction of movement of the carriage and relatively flexible in all non-linear directions. Thus, misalignment, oscillation of the screw about its axis or wobble of the nut will not cause binding of the nut to the screw nor will non-linear movement or forces be transmitted to the carriage causing it to deviate from its straight linear direction.

In the exemplary embodiment of FIG. 1 a precision measuring machine is shown generally at 2 comprising a base 4, movable carriage 6, superstructure 8, and a measuring probe 10. A second carriage 12 is mounted on the superstructure for movement of probe 10 transverse to the direction of movement of carriage 6. A workpiece W to be measured is shown on carriage 6.

Carriage 6 is supported for movement on precision guideways 14 and 16. The carriage is positioned by precision lead screw 18 and traveller 20, which is adapted to move axially thereon as the screw is rotated. The traveller 20 or nut is connected to the carriage through an intermediate member 22. A drive motor, not shown, is an integral part of the driving means with the screw acting as the motor shaft.

The intermediate member or driving connection is best seen in FIGS. 3 and 4. A single rigid plate is used to form member 22. The intermediate member is divided into three separate sections 22a, 22b, and 22c, by a plurality of slotted apertures in the plate transverse to the axis of movement. Flexure points 24 and 26 respectively join the end sections of member 22 to the center section. End section 22a is secured to nut 20 by any suitable means such as bolts 28 and section 22c is secured to carriage 6 with bolts 30.

As can best be seen in FIG. 2 and FIG. 4, the thickness of the end sections 22a and 22c are the same and the thicknesses of center section 22b and pivots 24 and 26 are slightly less than that of the end sections. Thus, the upper surfaces of 22a, 22b, and 24 and 26 lay in the same plane while the bottom surfaces of 22b, 22c, 24 and 26 are in the same plane.

With the driving connection 22 installed as in FIG. 2, it is seen that a slight clearance exists between the upper surface of section 22a and carriage 6. A similar clearance occurs between the bottom surface of section 22c and nut 20. A direct rigid connection is established between nut 20 and carriage 6 in the axial direction of movement of the nut 20 along the screw 18. The slight clearance between surfaces as previously described permit a limited amount of vertical movement of the nut relative to the carriage while maintaining the rigid connection in the driving direction.

Flexure areas 24 and 26 provide for a limited movement of the end sections in a direction transverse the linear direction of movement and also for limited pivoting action of the end sections about the axis of linear movement of member 22.

Connecting member 22 thus maintains a rigid connection in the axial direction of movement yet is relatively flexible in all other directions. Should oscillation of the screw and nut about the axis of rotation or wobble of the nut now occur, the non-linear movements and forces will not be transmitted to the carriage.

A modified connecting member 32 comprising sections 32a, 32b and 32c is shown in FIG. 5. The three sections shown in FIG. 5 correspond to the three sections 22a, 22b and 22c of FIGS. 3 and 4 and are similarly connected to a driving member and a driven member. Flexure areas 34a–34b and 36a–36b provide a yieldable connection respectively between sections 32a–34b and 32b–34c. The thicknesses of the three sections correspond to that described in FIG. 4 such that a slight clearance exists between upper surfaces 32a–34b and 32c. A slight clearance also exists between lower surfaces 32b–32c and 32a.

The embodiment of FIG. 5 thus presents a driving connection which gives a rigid connection in the driving direction yet permits limited non-linear movement of the driving member.

It is thus seen that the objectives of this invention have been accomplished. A connecting member between a driven member and a driving member has been described which allows limited non-linear movement of the driving member to be present without affecting the linearity or straightness of movement of the driven member, and while avoiding transmittal of bending or other disturbing forces, limiting those forces transmitted to those effective only in the desired driving direction.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A motion translation device providing linear movement of a driven member from a driving member having linear and non-linear movement comprising,
   a first member,
   a second member mounted for linear movement relative to said first member,
   guide means cooperating between said first and second members controlling the precise linear movement of said second member relative to said first member,
   drive means on said first member having a substantially linear movement parallel to the direction of linear movement of said second member for moving said second member along said guide means,
   and a driving connection between said drive means and said second member rigid in the direction of linear movement of said second member and relatively yieldable in all other directions wherein non-linear movement of said drive means is not transmitted to said second member.

2. A motion translation device providing linear movement of a driven member from a driving member having linear and non-linear movement comprising,
   a base,
   a carriage,
   guide ways mounted on said base supporting said carriage and controlling the linear movement of said carriage along said ways,
   a screw mounted on said base substantially parallel to said guideways,
   a nut on said screw adapted to move axially upon rotation of said screw for movement of said carriage,
   and a driving connection between said nut and said carriage, said driving connection comprising a unitary member rigid in the linear direction of movement of said carriage and relatively flexible in all other directions of movement wherein said nut may remain concentric with the centerline of said screw irrespective of misalignment between said screw and said ways and whereby only movement of said nut parallel to said guide ways will be transmitted to said carriage.

3. A motion translation device providing linear movement of a driven member from a driving member having linear and non-linear movement comprising,
   a base,
   a carriage,
   guide ways mounted on said base supporting said carriage and controlling the linear movement of said carriage along said ways,
   a screw mounted on said base substantially parallel to said guideways,
   a nut on said screw adapted to move axially upon rotation of said screw for movement of said carriage,
   and a driving connection between said nut and said carriage rigid in the linear direction of movement of said carriage and relatively flexible in all other directions of movement wherein said nut may remain concentric with the centerline of said screw irrespective of misalignment between said screw and said ways, said driving connection comprising,
   a rigid plate slotted transverse to the linear direction of movement and defining a first end section, a second end section, and a center section,
   integral flexure means respectively connecting each of said end sections with said center section,
   said first end section being connected to said nut and said second end section being connected to said carriage whereby a rigid connection is established between said nut and said carriage in the linear direction of travel and said flexure means permit limited non-linear movement of said nut without said non-linear movement being transmitted to said carriage.

4. A motion translation device as defined in claim 3 in which the thickness of said center section is slightly less than the thickness of said end sections with the upper surfaces of said center section and said first section lying in the same plane and the lower surfaces of said second section and said center section lying in the same plane.

References Cited

UNITED STATES PATENTS

| | | | |
|---|---|---|---|
| 2,920,498 | 1/1960 | Federn | 74—470 |
| 3,276,284 | 10/1966 | Rinck | 74—424.8 |

FRED C. MATTERN, Jr., *Primary Examiner.*

L. H. GERIN, *Assistant Examiner.*